Aug. 18, 1931.  A. C. DAVIS  1,819,739
MANUFACTURE OF CEMENT AND THE LIKE
Filed Nov. 19, 1927  2 Sheets-Sheet 1
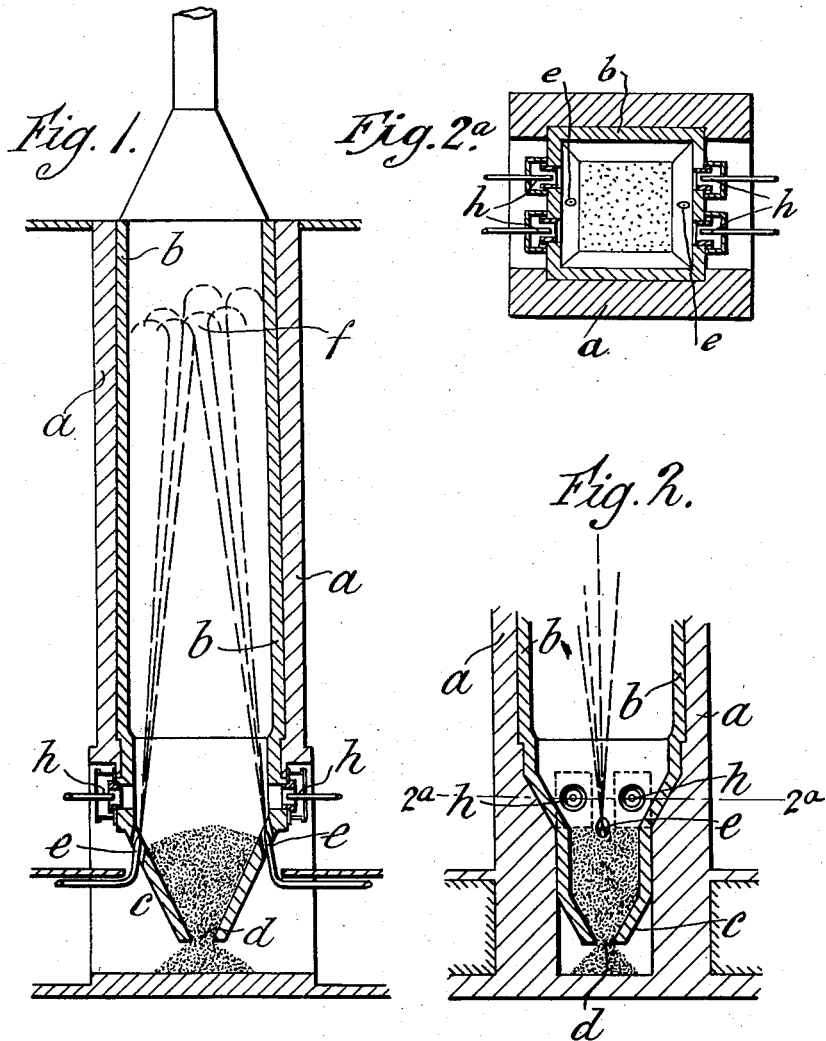

Aug. 18, 1931.  A. C. DAVIS  1,819,739
MANUFACTURE OF CEMENT AND THE LIKE
Filed Nov. 19, 1927   2 Sheets-Sheet 2
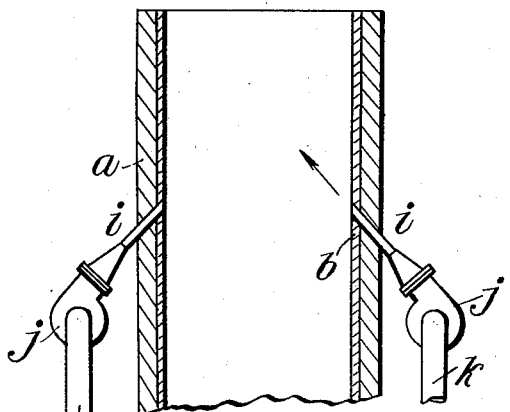
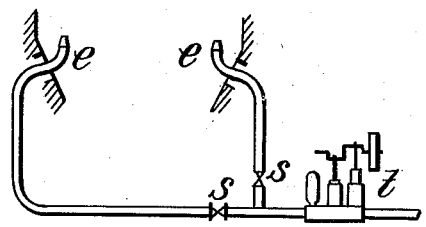
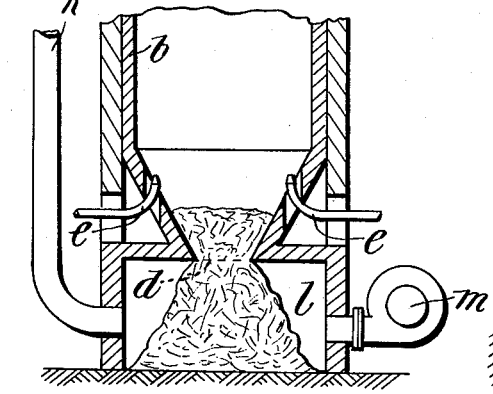
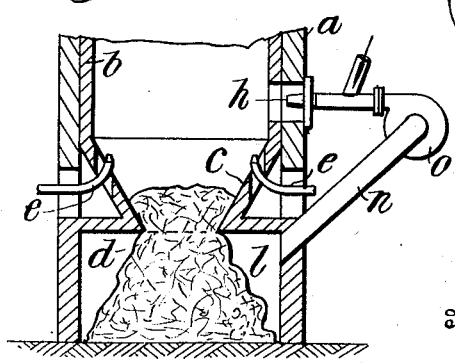
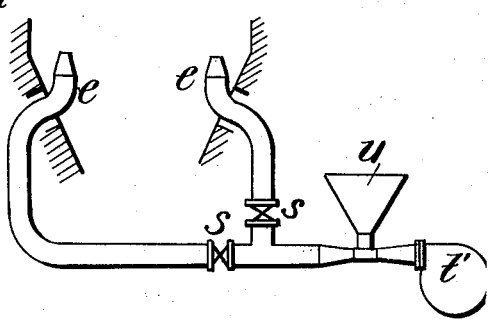
Inventor
Arthur Charles Davis
By Baldwin & Wight
Attorneys Patented Aug. 18, 1931

1,819,739

UNITED STATES PATENT OFFICE

ARTHUR CHARLES DAVIS, OF WESTMINSTER, LONDON, ENGLAND

MANUFACTURE OF CEMENT AND THE LIKE

Application filed November 19, 1927, Serial No. 234,504, and in Great Britain October 11, 1927.

This invention relates to a cement making process and involves the use of kilns of a vertical type.

According to this invention a process for the manufacture of cement in a kiln of the type set out consists in injecting a jet or jets of cement slurry or other cement forming materials into the kiln in a path substantially parallel with the length thereof. Preferably the cement slurry or other cement forming material is projected into the kiln in an upward direction and from a point beneath the plane of the combustion zone so that it has a passage upwardly and downwardly through the hot gases.

According to a further feature of the invention, the velocity at which the cement slurry or other cement forming materials is projected into the kiln and its degree of atomization may be so arranged that the cement slurry or other material is kept in suspension by the velocity of the air until its density is increased by calcination to such an extent as to cause the grains to fall to the base of the kiln.

The cement slurry is composed of the usual mixtures including chalk or limestone and clay or shale with water and has a specific gravity of less than 2.0. Upon drying the specific gravity increases by removal of the water to above 2.0, and upon further heating, $CO_2$ from the carbonate of lime is driven off and the specific gravity increases to about 3.1. Upon further heating to a temperature of about 1400° C. known as the clinkering temperature the specific gravity is not altered, but the apparent density of the particles is increased by shrinkage. It should be understood that the cement slurry feed to the kiln may be substituted by the raw material in the form of a dry powder.

It will be seen therefore that by adjustment of air velocities in the kiln, combined with the adjustment of the degree of atomization of the cement slurry, it is possible to keep the particles in suspension until the real density attains 3.1 and the apparent density is sufficient to cause the particles to drop, their conversion into cement clinker being then complete.

Means are also preferably provided for adjusting the flame temperature so that in combination with the degree of atomization of the cement slurry the period occupied in falling through the flame is sufficient to raise the temperature of the material to the clinkering temperature which is in the neighbourhood of 1400° C., that is to say with coarsely atomized cement slurry the period for transmission of the heat throughout the particles will be longer and in such a case the flame temperature must be raised, and conversely.

The flame may also be adjustable as to shape and its behaviour so that if necessary it may be given a swirling motion to facilitate the heating of the material for the required time.

In a vertical kiln constructed in accordance with this invention cement slurry is introduced through one or more jets located at or adjacent to one end of the kiln and preferably at the base.

In one construction two cement slurry jets may be employed located adjacent the periphery of the kiln, in combination with four oil, coal or other type burners arranged in pairs opposite to one another, a jet being positioned intermediate each pair such that the cement slurry spray has a free path at its outset.

Such a construction possesses the advantage that an outlet for the clinker may be formed in the base of the hearth. Preferably the hearth in this construction tapers off to a centrally located orifice forming the outlet.

The clinker after passage from the kiln may fall on to a surface from which it is removed by conveyors or the like, or when it is desired to extract the heat therefrom it may be subjected to contact with a current of air which may subsequently be used for heating purposes.

In one arrangement the clinker may fall into a pit located beneath the exit orifice of the kiln into which air is blown.

When coal is employed as the combustion medium the hot air from the clinker may be utilized to project it into the furnace.

In some cases it may be desirable to agitate the cement slurry, or other cement forming material while passing through the kiln and preferably the hot air is employed for this purpose, one or more jets being provided in the walls of the kiln.

Preferably the jets are set at such an angle that the peak of the spray coincides with a point on the axis of symmetry near the upper portion of the kiln. The raw cement material nozzles may be so designed as to be readily adjustable in order to enable the degree of atomization and the angle of spray to be varied.

The products of combustion from the kiln or the hot air from the clinker may be utilized to heat a boiler.

It will be seen that the cement slurry jet or jets which is or are located on the under and outside of the hearth do not come into contact with the high temperature gases.

The kiln has the further advantage of producing clinker of small size so as to facilitate the final grinding which is the next process in cement manufacture.

The kiln has the advantage over a rotary kiln fed by cement slurry sprays in that there is no cascading or movement of the material inside the kiln such as occurs in a rotary kiln giving rise to dust which may constitute a nuisance as the dust thus produced in a rotary kiln is so fine as to be carried away by the gases leaving the kiln.

The invention is applicable to both cement and lime burning.

The invention is illustrated in the accompanying drawings in which Figure 1 is a sectional elevation and Figure 2 is a fragmentary sectional view at right angles thereto of a vertical kiln for the manufacture of cement constructed in accordance with this invention.

Figure 2ᵃ is a cross sectional view taken on the line 2ᵃ—2ᵃ of Figure 2.

Figures 3 and 4 are vertical sections of modified forms of kilns, and

Figures 5 and 6 are diagrammatic views showing details of the jets for the raw cement material.

In the drawings $a$ is a vertical wall of the kiln and $b$ the refractory lining thereof.

Referring now to Figures 1, 2, 3 and 5 the lower end of the kiln is tapered as at $c$ and is provided with a clinker outlet $d$.

Two jets $e$ for projecting a spray of cement slurry, or other cement forming materials are shown located adjacent the periphery of the kiln, although any suitable number may be employed. The jets $e$ are adjustable as to angle of throw as at S (Figs. 5 and 6) so that the spray peak indicated generally at $f$ may be adjusted to give the desired length of path to the cement slurry or other material through the hot gases.

Four oil, coal or other burners $h$ are provided located on either side of the cement slurry or other spray, and arranged in pairs opposite one another, a jet being positioned intermediate each pair such that the spray has a free path at the outset. This construction possesses the advantage that the clinker outlet may be formed in the base or hearth and is not restricted.

It will be seen that the cement slurry jet or jets are located on the under and outside of the hearth, and do not come into contact with the high temperature gases.

It is clear that in a circular shaft kiln the burners may be arranged in a ring.

Air inlets $i$ (see Figure 3) are preferably also provided for feeding supplementary air to agitate the particles in suspension, the air being drawn in by fans $j$ through pipes $k$ leading from the outlet $d$, the base of the kiln being bricked or otherwise closed in to form a pit or chamber $l$ so that air passing through is heated by contact with the hot clinker. $m$ is a fan for producing an air blast for cooling the hot clinker and maintaining air pressure in the chamber $l$.

In Figure 4 the clinker is used to heat air which is drawn through a pipe $n$ by a fan $o$ for the supply of combustion air to the burner.

Referring to Figures 5 and 6 the pipes for supplying raw material to the jets $e$ have valves $s$ for controlling the amount of cement slurry or other raw cement material fed to the kiln. $t$ indicates generally pumping mechanism (Figure 5) for varying the degree of automization, a fan $t'$ being substituted therefore in Figure 7 which is intended for use with cement material in powder form which is fed through a hopper $u$ and projected into the kiln by the air blast from the fan $t'$.

The jets as shown in Figs. 1, 2, 3 and 4 are set at such an angle that the peak of the spray coincides with a point on the axis of symmetry at the top of the kiln. For this purpose the mountings of the jets may be adjustable to enable the angle of spray to be set as desired so that the height of the peak may be varied.

It is clear that the products of combustion from the kiln and the hot air from the clinker may be utilized to heat a boiler.

To increase the draught and more particularly to prevent disturbance of the spray by wind the top of the kiln is preferably provided with a tapering chimney.

What I claim is:—

1. A process for the manufacture of cement and the like in a kiln of the vertical type having a horizontal combustion zone, which consists in injecting the raw cement material separate from fuel and in a state of suspension into the kiln in an upward direction at a point located beneath the combustion zone, and in causing the material to traverse said zone in an upward direction to a height sufficient for calcination and fall downwardly therethrough to the base of the kiln.

2. A process for the manufacture of cement and the like in a kiln of the vertical type which consists in injecting the raw cement material separate from fuel and in a state of suspension into the kiln in an upward direction at a point located beneath the combustion zone to a height sufficient for calcination and in subjecting the material in suspension during its upward and downward path in the kiln to the action of an air blast.

3. A process for the manufacture of cement and the like in a kiln of the vertical type which consists in injecting the raw cement material separate from fuel and in a state of suspension into the kiln in an upward direction at a point located beneath the combustion zone to a height sufficient for calcination and in subjecting the material in suspension during its upward and downward path in the kiln to the action of an air blast heated by contact with the clinker from the kiln.

4. In apparatus comprising a vertical kiln, particularly for the manufacture of cement and the like, the combination of means, located adjacent the base of the kiln, for projecting raw cement material to be treated in a divided state in an upward direction to a height sufficient for calcination, and a burner to form a combustion zone substantially at right angles to the path of projection of the jet.

5. In apparatus comprising a vertical kiln particularly for the manufacture of cement and the like the combination of a jet located at the base of the kiln for projecting raw cement material to be treated in an upward direction to a height sufficient for calcination and in the form of a spray, and a burner located in a plane immediately above that of the delivery of the jet to form a combustion zone substantially at right angles to the path of projection of the jet.

6. In a vertical kiln for the manufacture of cement and the like the combination with a burner located in the lower portion of the kiln of a jet for the introduction of raw cement material in a divided state and located in a plane beneath that of the burner to direct the raw cement material in an upward path which traverses the combustion zone and to a height sufficient for calcination.

7. In a vertical kiln for the manufacture of cement and the like the combination with a burner located adjacent the base of the kiln, of a plurality of jets for the introduction of raw cement material in a divided state and located in a plane beneath that of the burner to direct the raw cement material in an upward direction which traverses the combustion zone to a height sufficient for calcination, and the chamber of the kiln being unobstructed to upward passage of the material to said height.

8. In a vertical kiln for the manufacture of cement and the like the combination with a burner located adjacent the base of the kiln, of a plurality of jets for the introduction of raw cement material in a divided state and located in a plane beneath that of the burner to direct the raw cement material in an upward direction which traverses the combustion zone to a height sufficient for calcination, and the chamber of the kiln being unobstructed to upward passage of the material to said height and an outlet for the clinker arranged subtsantially coincident with the line of symmetry of the kiln.

9. A vertical kiln as claimed in claim 7 comprising oppositely located pairs of burners, and jets for the introduction of raw cement material arranged intermediate said pairs.

10. In a vertical kiln for the manufacture of cement and the like the combination with a burner located adjacent the base of the kiln, of a plurality of jets for the introduction of raw cement material in a divided state and located in a plane beneath that of the burner to direct the raw cement material in an upward direction which traverses the combustion zone to a height sufficient for calcination, and the chamber of the kiln being unobstructed to upward passage of the material to said height and means permitting adjustment of the angles of projection of said jets.

11. In a vertical kiln for the manufacture of cement and the like the combination with a burner located adjacent the base of the kiln, of a plurality of jets for the introduction of raw cement material in a divided state and located in a plane beneath that of the burner to direct the raw cement material in an upward direction which traverses the combustion zone to a height sufficient for calcination, the chamber of the kiln being unobstructed to upward passage of the material to said height, means permitting adjustment of the angles of projection of said jets and means for varying the velocity of projection thereof.

12. In a vertical kiln for the manufacture of cement and the like, the combination with a burner, of a plurality of jets for the introduction of raw cement material in a divided state and located adjacent the base of the kiln and beneath the plane of said burner, the chamber of the kiln being unobstructed to upward passage of the material to a height sufficient to permit calcination of the material an outlet for the clinker and means for heating air from the heat from the clinker.

13. In a vertical kiln for the manufacture of cement and the like the combination with a burner, of a plurality of jets for the introduction of raw cement material in a divided state and so arranged that the material in its upward path reaches a height sufficient for calcination and traverses the combustion zone, the chamber of the kiln being unobstructed to upward passage of the material to said height, means permitting variation in the angles of projection of said jets and the velocity of projection thereof, an outlet for the clinker, an air blast for extracting heat from said clinker and means for discharging the hot air blast.

In testimony that I claim the foregoing as my invention I have signed my name this 21st day of October, 1927.

ARTHUR CHARLES DAVIS.